Oct. 6, 1970  I. J. McCULLOUGH ET AL  3,532,969
METHOD FOR MAGNETICALLY MEASURING WALL THICKNESS
OF METAL PIPES AND PLATE STRUCTURES
Filed Feb. 20, 1968

IRA J. McCULLOUGH
STANLEY G. STROUD
INVENTORS.
WHANN & McMANIGAL
ATTORNEYS FOR APPLICANTS
BY

United States Patent Office 3,532,969
Patented Oct. 6, 1970

3,532,969
METHOD FOR MAGNETICALLY MEASURING WALL THICKNESS OF METAL PIPES AND PLATE STRUCTURES
Ira J. McCullough, Los Angeles, and Stanley G. Stroud, San Pedro, Calif.; said McCullough assignor to National Lead Company, Houston, Tex., a corporation of New Jersey
Filed Feb. 20, 1968, Ser. No. 706,818
Int. Cl. G01r 33/12
U.S. Cl. 324—34     4 Claims

ABSTRACT OF THE DISCLOSURE

Means and method for magnetically measuring metal thickness such as plate structures and wall thickness of pipes, which are accessible from the inside, but not necessarily from the outside. In the case of a pipe a primary coil and secondary coil are positioned in inductively coupled spaced relation within the pipe, with means for attenuating the magnetic field from the energized primary coil which is within the pipe, such attenuating means comprising a short circuited turn or ring of current conducting material such as copper or aluminum positioned between the coils and acting to inductively generate a magnetic field in opposition to the magnetic field coupling in the path lying within the pipe between the coil. Laminated rings positioned at the ends of the primary coil and secondary coil further act to concentrate the magnetic field so that it forms a coupling path outside of the pipe and in addition concentrates the magnetic flux at the position where the flux passes through the pipe wall.

BACKGROUND OF THE INVENTION

The invention relates to the general field of magnetic measuring devices.

The necessity of being able to properly measure the wall thickness of pipes has heretofore been recognized in the case of pipes, and particularly pipes which are buried in the ground such as oil well casings in which the inside is readily accessible, while access to the outside is either inconvenient or impossible. Thus, it is very desirable to measure the wall thickness of an oil well casing in order to determine the extent and exact location of metal loss due to external corrosion, internal wear, and other metal losses which might lead to rupture or formation of a hole in the pipe or casing. Determination and location of such damage and its extent will permit the taking of remedial action for preventing further damage, and allow the making of repairs where such damage is minor.

With present day steadily increasing drilling depths, the oil well casings are necessarily becoming of greater diameter and have heavier wall structures so as to permit the use of multiple casing string installations in which a large diameter casing string may be run to an intermediate depth, and the drilling continued through this casing string to a greater depth, whereupon another casing string may be run. In view of the large capital investment required, it is essential to be able to determine the condition of these large deep casing installations.

A testing device has heretofore been described in the U.S. Letters Patent of William R. MacLean No. 2,573,799, which is arranged to measure variations in wall thickness of metal pipe by means of an electromagnetic method utilizing the phenomenon of the attenuation of an alternating electromagnetic field propagated through a metallic material. Briefly the device of this patent utilizes a primary coil and associated secondary coil or a pickup coil which is suitably spaced from the primary coil, these coils being mounted on a supporting structure which will permit lowering into an oil well casing or passing through a pipe. The primary coil is supplied with an alternating current and generates a magnetic field which passes outwardly through the pipe wall and returns through the pipe wall to the secondary or pickup coil. The attenuation or a phase shift of the magnetic field is detected by the signal induced in the secondary coil, either the attenuation or phase shift being then utilized through suitable instruments as a measure of the wall thickness of the pipe. According to the patented concept, the spacing between the primary coil and the secondary coil is stated as being sufficiently large so that the voltage induced in the secondary coil will vary exponentially with the thickness of the pipe wall, so as to assure that the spacing between the coils is large enough and that only a small portion of the magnetic field will proceed directly from the primary coil to the secondary coil.

It therefore appears that with the present day deep oil wells and the thicker walls of the casings now being utilized, a very serious problem arises with respect to testing devices based on the concept of the MacLean patent. If the spacing between the primary coil and the secondary coil is made sufficiently large to minimize the direct coupling inside the pipe between the coils, then the energy coupled to the secondary coil, after passing through the pipe or casing wall, is so small and reduced in its amplitude or phase measurements as to be unreliable, and in some cases even impossible to detect.

The present invention constitutes an improvement over the MacLean patented structure, and solves the problem by the provision of additional elements for attenuating the magnetic field within the pipe between the primary and secondary coils, which permits positioning of the coils in a closer spaced relation so as to take advantage of and obtain a more reliable and forceful wall thickness indicating signal.

SUMMARY OF THE INVENTION

The present invention relates to a method and apparatus for measuring the wall thickness of metal pipe casing, tubing and the like, and is more particularly concerned with the obtainment of such measurements in such structural elements, when installed so as to be accessible from the inside thereof, but not necessarily from the outside.

With the foregoing in mind, it is one object of the herein described invention to provide improved apparatus for magnetically measuring the wall thickness of pipes, and in particular pipes having relatively thick walls, and walls having relatively high magnetic permeability.

A further object is to provide an improved device of the character described utilizing a primary coil and secondary coil in magnetically coupled relation within the pipe to be measured, and including means within the pipe for attenuating the magnetic field within the pipe in a coupling path directly between the coils so as to provide a relatively higher detected signal level, and a relatively low noise level.

Another object is to provide a short circuited turn of metallic material between the primary and secondary coils for generating an induced magnetic field in opposition to the magnetic field normally coupling the coils within the pipe, so as to permit a more close spacing of the coils.

Still another object is to provide laminated ring members at the ends of the primary and secondary coils for providing a salient path for the magnetic field, and for concentrating the magnetic flux at the periphery of the coils where the flux passes through the pipe wall material, so as to provide greater density and resolution with respect to the determination of the pipe wall thickness.

In the attainment of the above objects, the present invention solves the disadvantages and problems as previously enumerated in discussing the known prior art.

Further objects and advantages of the invention will be brought out in the following part of the specification, wherein detailed description is for the purpose of fully disclosing the preferred embodiment of the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
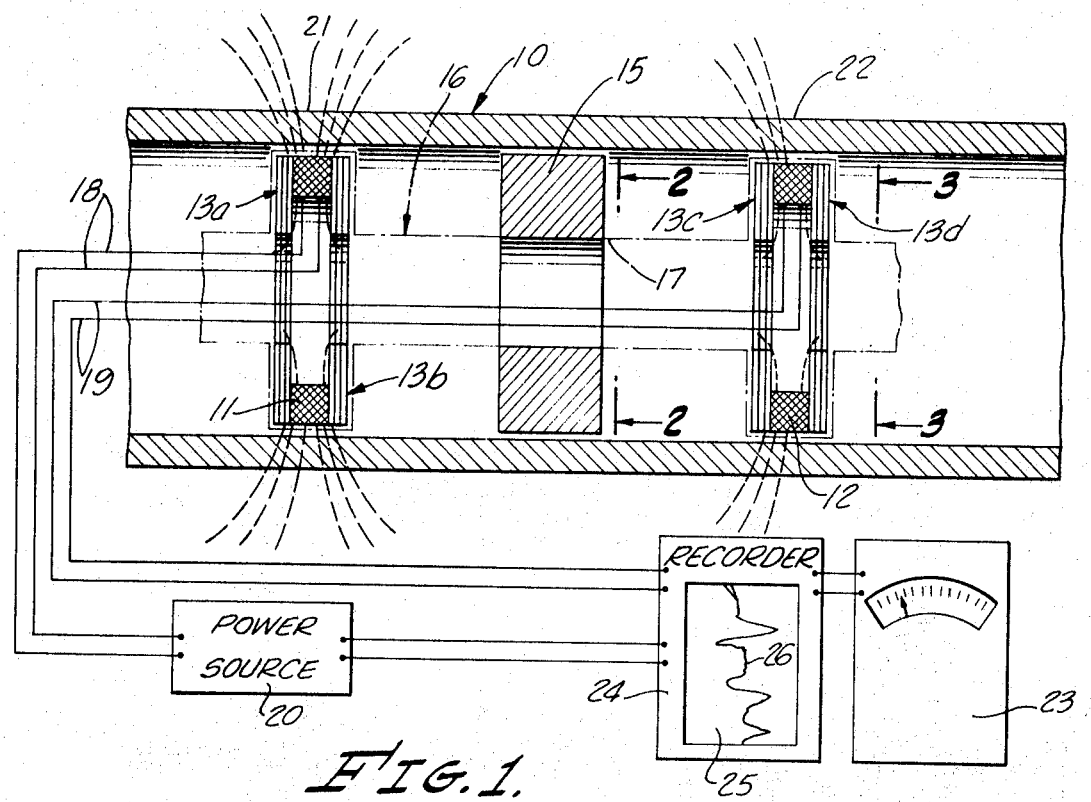
FIG. 1 is a view schematically illustrating the arrangement of the primary and secondary coils and associated elements as arranged within a pipe to be tested according to the present invention.
Figure 2:
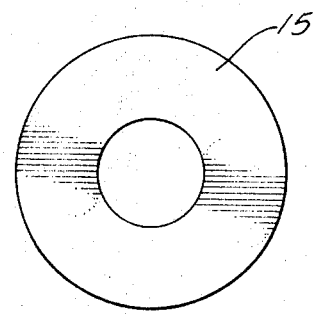
FIG. 2 is an elevational view of the ring member positioned between the primary and secondary coils, as seen from line 2—2 of FIG. 1.
Figure 3:
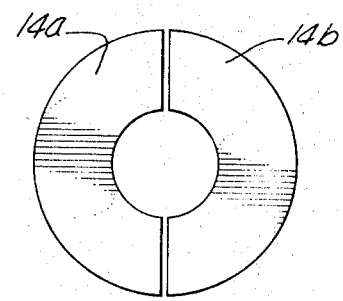
FIG. 3 is a similar view of the laminations of the ring structure at the ends of the coils, as seen from line 3—3 of FIG. 1.

Referring more specifically to the drawings, for illustrative purposes, the invention is disclosed in FIG. 1 as comprising a pipe or casing 10 which is to be tested for the purpose of determining variations in its wall thickness. There is disclosed apparatus according to the present invention which includes a primary coil 11 and a secondary coil or a pickup coil 12, these coils being axially spaced within the pipe and being in electromagnetically coupled relation. At each end of the primary coil and secondary coil, end rings 13a, 13b, 13c and 13d are respectively provided. Each end ring is composed of stacked disc laminations of silicon steel, the laminations comprising semicircular sections 14a and 14b which cooperatively form a split ring for preventing circumferential circulation of electric current therein.

Between the primary and secondary coils, there is positioned a ring member 15 of current carrying material such as aluminum or copper, this ring in effect providing a circumferentially extending current path of very low resistance.

The elements thus far described are of such size that their peripheries will be positioned in relatively close proximity to the interior surface of the pipe wall, but having sufficient spacing to permit axial movement thereof and allow for slight imperfections or distortions of the pipe wall surface. In order that the elements may be moved as a unit and have a predetermined desired interrelation spacing, the elements are mounted upon a supporting structure which may assume various configurations and embody a variety of mounting means. In general, the elements will be mounted upon a sealed housing as generally indicated in phantom lines by the numeral 16, this housing including a core portion 17 which extends between the coils and provides a mounting for the ring member 15. At each coil, the housing extends around the coil and associated end rings so as to form a sealed enclosure. The housing 16 may be constructed to provide a probe at the end of a flexible cable (not shown) by means of which a pair of connection wires 18 to the primary coil 11, and a pair of connection wires 19 to the secondary coil 12 may be carried to the surface of the ground at the top of the oil well, for connection with power sources and other instrumentation as will hereinafter be described.

The primary coil is arranged to be supplied with a low frequency alternating current, sixty cycles per second being typical, from a power source 20. A magnetic field is thus generated by the primary coil which radiates outwardly through the adjacent annular wall area of the pipe at 21, and returns through the wall area at 22 adjacent the secondary coil. In addition to this path of the magnetic field, which may extend through a coupling path externally of the pipe, there is also a tendency to magnetically couple the primary and secondary coils directly through an internal coupling path extending between the coils and lying within the interior of the pipe wall. As a result of this magnetic coupling, induced signals will be created in the secondary coil which have a known relationship with respect to the pipe wall thickness.

As known from the prior art structures, the coil spacings are such that as the spacing increases, the presence of the pipe has a dominating effect, and the energy received by the secondary coil falls off as a negative exponential. The secondary coil at this time is actually receiving energy in two ways: First, directly from the primary coil which energy is weakened by the attenuation due to distance, and second, indirectly by energy which has made the double transit of the pipe wall as explained above. This latter energy is weakened by this double transit and also by the inverse power law. As the spacing increases still more, the direct energy under the influence of the exponential law will eventually fall below the indirect energy obeying the weaker inverse power law and the latter energy will dominate. At this point the coil spacing was considered sufficient according to the prior art devices. It will be appreciated however that at this formerly considered proper spacing, the distance between the coils is so great that the indirectly received energy, which has made the double transit of the pipe, is very weak and under conditions where the pipe wall is very thick or has a high permeability, the signal so received is unreliable and in some cases impossible to receive. Moreover, at the proper spacing according to the prior art devices, there is a high noise level which is undesirable.

In accordance with the present invention, by introducing the ring member 15 between the coils, the magnetic field of the coupling part within the pipe between the coils operates to generate a circulating current in the ring which creates a magnetic field in opposition to the coupling field which would otherwise exist within the pipe between the coils. This attenuation permits the primary and secondary coils to be more closely spaced and thus obtain stronger signals from the energy flow which has made the double transit of the pipe wall. A stronger and more reliable signal is thus obtainable.

The usefulness and reliability of the device as improved in the present invention are also enhanced by the incorporation of the end rings 13a and 13b at the primary coil, and the end rings 13c and 13d at the secondary coil. While rings are shown at both ends of each of these coils it has been found in actual practice that the operation is creditably improved by the utilization of a single ring placed either at the primary coil or at the secondary coil. The effect of these rings is to provide a low reluctance magnetic flow path for the magnetic field flux at the coils, and the rings further act to retain the flux and concentrate the magnetic field in the areas 21 and 22 so as to provide increased flux density therein. As a result of the effect produced, better resolution and measurements of the wall thickness will result.

The magnitude of the voltage induced in the secondary coil 12 will vary with the wall thickness in the same way that the flux varies, that is, exponentially. This means that if the induced voltage is measured with a logarithmic voltmeter, the readings will be linearly related to the wall thickness. The scale reading could thus be simply calibrated to read directly in wall thickness. As an alternative, a phase measurement yielding the same result may be made. Since the phase angle between the induced electromotive force in the secondary coil 12 and the current flowing in the primary coil 11 is linearly related to the wall thickness, a phase meter measuring this angle may be directly calibrated in terms of thickness. As shown in FIG. 1, a meter or instrument 23 is shown. This instrument may be a logarithmic voltmeter or a phase meter, depending upon the type of indication desired. Such meter is connected by conventional circuitry which is well known.

It is also possible to utilize a recording instrument, as indicated at 24 so that a permanent record of wall thickness as a function of axial location of the probe in the pipe will be obtained and recorded upon a chart 25 to provide a graph 26 as the probe is moved through the pipe. In this case it would be desirable to interlock the movement of the probe with the movement of the recording paper, such arrangements being well known in the art of well logging.

The invention has been used in the testing of pipes having diameters in the order of two inches to nine inches. It will be appreciated that the size of the associated elements will vary according to the size of pipe to be tested. One unit, for example, embodying the present invention was used in testing a pipe having an internal diameter of approximately seven inches. In this case the ring member 15 was of the order of a few inches in length, and the primary and secondary coils were spaced apart a distance of approximately two pipe diameters.

While the invention has been described, for illustrative purposes, for use in measuring pipes; it will be appreciated that in its broad concept the invention may be used for measuring the thickness of metal plates and other metal structures.

From the foregoing description and drawings, it will be clearly evident that the alleged objects and features of the invention will be accomplished.

Various modifications will suggest themselves to those skilled in the art without departing from the spirit of our invention, and, hence, we do not wish to be restricted to the specific form shown or uses mentioned, except to the extent indicated in the appended claims.

We claim:

1. The method of measuring wall thickness, comprising:
   (a) providing a primary circuit including a single primary coil;
   (b) providing a secondary circuit including a single secondary coil substantially the same as said primary coil;
   (c) arranging said coils in predetermined coaxial spaced relationship adjacent to and on the same side of said wall;
   (d) providing a shield of substantially the same diameter as said coils and of current conducting material between said primary coil and said secondary coil and spaced therefrom;
   (e) applying a low frequency alternating current on the order of 60 c.p.s. to said primary coil to generate a magnetic field;
   (f) inducing a signal in the secondary coil by means of said generated magnetic field through an indirect path passing through and exteriorly of the wall on the side opposite said coils and said shield and a direct path between the coils on the same side of said wall as said coils and said shield;
   (g) attenuating the magnetic field in the direct coupling path between the coils by means of said shield to cause the predominant portion of the flux coupling said coils to follow said indirect path; and
   (h) instrumentally observing variations in the signal induced in the second circuit by the flux which passes outwardly through said wall, along the indirect path exteriorly of the wall and then back through the wall to detect variations in wall thickness.

2. The method of measuring wall thickness as in claim 1 including the step of prividing means for concentrating the magnetic field at the portions of said path where it passes through the pipe wall.

3. The method of measuring wall thickness as in claim 1 including the step of providing at least one laminated ring of magnetic material positioned adjacent one end and coaxial with one of said coils to connect the magnetic flux coupling the coils to a path exteriorly of the wall.

4. The method of measuring wall thickness as in claim 1 including the step of enclosing the coils and shield within a sealed housing so as to form a sealed unit.

References Cited

UNITED STATES PATENTS

| | | | |
|---|---|---|---|
| 2,573,799 | 11/1951 | MacLean | 324—34.11 |
| 2,790,140 | 4/1957 | Bender | 324—34.11 |
| 2,992,390 | 7/1961 | De Witte | 324—37 |
| 3,060,377 | 10/1962 | Schmidt | 324—37 |
| 3,075,144 | 1/1963 | Cooper | 324—37 |
| 3,243,697 | 3/1966 | Schmidt | 324—34 |

FOREIGN PATENTS

| | | |
|---|---|---|
| 991,890 | 5/1965 | Great Britain. |

RUDOLPH V. ROLINEC, Primary Examiner

R. J. CORCORAN, Assistant Examiner